US012570077B2

(12) United States Patent
Levine et al.

(10) Patent No.: US 12,570,077 B2
(45) Date of Patent: Mar. 10, 2026

(54) EXTRUDED REINFORCED INDUSTRIAL BELT WITH EMBEDDED LAYER

(71) Applicant: Albany International Corp., Rochester, NH (US)

(72) Inventors: Mark J. Levine, Appleton, WI (US); Robert Hansen, North Muskegon, MI (US); Vivek Goel, Summerville, SC (US); Erin Lynn Camponeschi Brotherson, Avondale, PA (US)

(73) Assignee: Albany International Corp., Portsmouth, NH (US)

( * ) Notice: Subject to any disclaimer, the term of this patent is extended or adjusted under 35 U.S.C. 154(b) by 0 days.

(21) Appl. No.: 18/217,379

(22) Filed: Jun. 30, 2023

(65) Prior Publication Data

US 2025/0001743 A1 Jan. 2, 2025

(51) Int. Cl.
*B32B 27/12* (2006.01)
*B29C 48/00* (2019.01)
(Continued)

(52) U.S. Cl.
CPC ............. *B32B 27/12* (2013.01); *B29C 48/15* (2019.02); *B32B 3/30* (2013.01); *B32B 5/022* (2013.01);
(Continued)

(58) Field of Classification Search
CPC .......... B32B 27/12; B32B 3/30; B32B 5/022; B32B 27/18; B32B 2260/023;
(Continued)

(56) References Cited

U.S. PATENT DOCUMENTS 4,740,409 A 4/1988 Lefkowitz
5,833,898 A * 11/1998 Dutt ...................... B29C 31/041
264/254
(Continued)

FOREIGN PATENT DOCUMENTS

EP 3 181 346 A1 6/2017
WO WO 2005/042836 A2 5/2005

OTHER PUBLICATIONS

International Search Report and Written Opinion prepared by the European Patent Office, acting as the International Searching Authority, for corresponding international application PCT/US2023/026806, mailed Jan. 19, 2024.

*Primary Examiner* — Abbas Rashid
*Assistant Examiner* — Elisa H Vera
(74) *Attorney, Agent, or Firm* — McCarter & English, LLP

(57) ABSTRACT

The present disclosure relates to an extruded industrial fabric. A method of manufacture of the industrial fabric is crosshead extruding a first layer polymeric matrix material with linear components. The linear components crosshead extruded with the polymeric matrix material may be continuous systems oriented in the machine direction. A nonwoven layer of material is provided on a surface of the first layer of polymeric matrix material and a second layer of polymeric matrix material is extruded onto the nonwoven layer of material. The first layer of polymeric matrix material at least partially encompasses the linear components. A faceside of the industrial fabric may be smooth or may include a texture or pattern. A backside may be smooth (planar), have a variable roughness, or include needled fibers that are incorporated into the structure of the fabric.

16 Claims, 4 Drawing Sheets

(51) Int. Cl.

| | |
|---|---|
| *B29C 48/07* | (2019.01) |
| *B29C 48/15* | (2019.01) |
| *B29C 48/154* | (2019.01) |
| *B29C 48/21* | (2019.01) |
| *B29K 105/08* | (2006.01) |
| *B29L 29/00* | (2006.01) |
| *B32B 3/30* | (2006.01) |
| *B32B 5/02* | (2006.01) |
| *B32B 27/18* | (2006.01) |

(52) U.S. Cl.
CPC .............. *B32B 27/18* (2013.01); *B29C 48/00* (2019.02); *B29C 48/07* (2019.02); *B29C 48/154* (2019.02); *B29C 48/21* (2019.02); *B29K 2105/0809* (2013.01); *B29K 2713/00* (2013.01); *B29L 2029/00* (2013.01); *B32B 2260/023* (2013.01); *B32B 2260/046* (2013.01); *B32B 2307/516* (2013.01); *B32B 2307/7265* (2013.01); *B32B 2413/00* (2013.01)

(58) Field of Classification Search
CPC ........ B32B 2260/046; B32B 2307/516; B32B 2307/7265; B29C 48/15; B29C 48/07; B29C 48/154; B29C 48/21; B29L 2029/00; B29K 2713/00
See application file for complete search history.

(56) References Cited

U.S. PATENT DOCUMENTS

| | | | |
|---|---|---|---|
| 5,972,813 A | 10/1999 | Polat et al. | |
| 6,406,577 B1 * | 6/2002 | Benedict .............. | B24D 11/005 |
| | | | 156/169 |
| 6,708,381 B2 | 3/2004 | Strandqvist et al. | |
| 8,709,214 B2 | 4/2014 | Inoue et al. | |
| 10,703,571 B2 | 7/2020 | Levine et al. | |
| 2014/0174689 A1 | 6/2014 | Karlsson et al. | |
| 2014/0272269 A1 | 9/2014 | Hansen | |
| 2018/0065318 A1 * | 3/2018 | Tyler ..................... | B29C 64/209 |
| 2018/0178486 A1 * | 6/2018 | Mecl ...................... | D04H 3/007 |
| 2020/0009812 A1 * | 1/2020 | Miller, IV .............. | B29C 65/08 |

* cited by examiner

EXTRUDED REINFORCED INDUSTRIAL BELT WITH EMBEDDED LAYER

FIELD OF THE DISCLOSURE

The present disclosure relates to an extruded industrial fabric. The industrial fabric, such as a belt, is produced by crosshead extruding a first layer polymeric matrix material with linear components oriented in the machine direction. An internal nonwoven layer is embedded between the first layer of polymeric matrix material and a second layer of polymeric matrix material.

BACKGROUND

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces that squeeze water therefrom, and that adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press, and dryer fabrics all take the form of endless loops on the paper machine and function in the manner of conveyors. It should further be appreciated that paper manufacture is a continuous process that proceeds at considerable speeds. That is to say, the fibrous slurry is continuously deposited onto the forming fabric in the forming section, while a newly manufactured paper sheet is continuously wound onto rolls after it exits from the dryer section.

Texturing belts in the papermaking and nonwovens fields are used to make three-dimensional nonwoven and tissue and towel structures. Typically, these belts are employed prior to or during the drying step of e.g., a papermaking process, where an increase in variation of the caliper of the belting can directly impart caliper, bulk, and three-dimensional patterning in the textured products produced, such as rolled goods. For this type of texturing belt, there usually exists a base weave for, e.g., dimensional stability and load bearing properties. Often, these belts have a second layer top surface added to the base weave specifically to impart caliper, texture, pattern, and bulk. This top surface can be made from a thermoplastic or thermoset material and is either applied directly in a melted or liquid form, or first produced as a sheet and then subsequently bonded to the surface of the base fabric of the belt. Bonding can either be chemical or thermal, or a combination thereof.

SUMMARY OF THE DISCLOSURE

Embodiments of the present disclosure relate to an industrial fabric. The industrial fabric comprises a first and second layer of extruded polymeric matrix material and further comprises an internal nonwoven layer between the first and second layers of extruded polymeric material. The first layer of extruded polymeric matrix material encapsulates linear components disposed in a machine direction (MD) of the fabric.

In some embodiments, the industrial fabric is impermeable. In other embodiments, the industrial fabric is permeable.

In certain embodiments, the internal nonwoven layer is selected from the group consisting of: batt fiber, needled fiber, needled batt fiber, spunlaid (spunbond) material, air-laid nonwoven material, meltblown material, spunlace material (hydroentangled), spunmelt/SMS material, and wetlaid material.

In some embodiments, the extruded polymeric material of the first and/or second layer impregnates the internal nonwoven layer.

In certain embodiments, the first layer of polymeric material partially encapsulates one or more of the linear components. In certain other embodiments, the first layer of polymeric material fully encapsulates one or more of the linear components, or all of the linear components.

In some embodiments, the linear components are yarns.

In yet other embodiments, the linear components are selected from the group consisting of: multifilaments, monofilament yarns, cords, spun yarns, tapes, twisted tow yarns, and untwisted tow yarns.

In still further embodiments, the linear components may be substantially parallel to one another, substantially in the same plane, or in a plurality of planes.

In certain embodiments the linear components have a sufficient modulus to be load-bearing.

In still further embodiments, the linear components are crosshead extruded with the first layer of polymeric material.

In certain embodiments, the linear components are selected from the group consisting of thermoset plastics, carbon, glass, polyesters and polyamides.

In certain embodiments, all of the linear components are of the same size and material.

In other certain embodiments, the linear components comprise first linear components and second linear components, wherein the first linear components are of a first size and/or a first material and the second linear components are of a second size and/or a second material.

In still further certain embodiments, the linear components comprise first linear components and second linear components, wherein a portion of the first and second linear components are of the same size and/or material.

In certain embodiments, at least one of the first and second extruded polymeric layers comprises a reinforcing material selected from the group consisting of: fibers, nanoparticles, nanomaterials, fiber materials, glass, carbon, inorganic fillers, polymeric material, and combinations thereof.

In still further embodiments, the reinforcing material is incorporated throughout the first or second extruded polymeric layer or a portion thereof.

In certain embodiments, the first extruded polymeric layer comprises the reinforcing material.

In certain embodiments, the extruded polymeric matrix material of at least one of the first and second layers is selected from the group consisting of: thermoplastics, polyurethane, co-polyesters, co-polyamides, hot melt glues, a co-polymer of thermoplastic polyurethane (TPU) with acrylic, a co-polymer of TPU with a polyester elastomer, and a co-polymer of TPU with a polyamide elastomer.

In certain embodiments, the extruded polymeric matrix material of the first layer is the same as the extruded polymeric matrix material of the second layer.

In other embodiments, the extruded polymeric matrix material of the first layer is different from the extruded polymeric matrix material of the second layer.

In certain embodiments, the industrial fabric comprises a first side and a second side and wherein the first side and the second side are planar and the one or more linear components do not extend through the first side or the second side.

In certain other embodiments, the first side comprises a pattern.

In further certain embodiments, the pattern on the first side is formed by a method selected from the group consisting of: laser etching, mechanical etching, embossing, and resin deposition.

In still further certain embodiments, the pattern on the first side is formed by an additive process.

In still further certain embodiments, the pattern on the first side is formed by a subtractive process.

In yet still further certain embodiments, the pattern on the first side is formed by a resin deposition technique selected from the group consisting of: a three-dimensional printing technique and an ink-jet printer technique.

In certain embodiments, the nonwoven industrial fabric is selected from the group consisting of: a conveyor belt; a papermachine clothing ("PMC"), wherein the PMC is a forming fabric, a press fabric, a dryer fabric, a shoe press belt, a transfer belt, a reel belt, a Through Air Drying ("TAD") fabric, an impression fabric, an Energy Efficient Technologically Advanced Drying ("eTAD") fabric, an Advanced Tissue Molding Systems ("ATMOS") fabric or belt, a New Tissue Technology ("NTT") fabric or belt, or a structured fabric; a double nip thickener ("DNT") fabric; a belt filter; a pulp washer; a belt, a fabric or a sleeve for the production of airlaid, spunbond, melt spun, or hydroentangled nonwoven material; a belt to produce a building product; a belt to produce oriented strand board ("OSB"); a fiber cement belt; a corrugator belt; a textile finishing belt; a sanforizing belt; a tannery belt; and a tannery sleeve. In further certain embodiments, the industrial fabric is a papermaking belt.

In certain embodiments, all linear components in the industrial fabric are disposed in the MD.

In certain embodiments of a method of forming the industrial fabric, the method comprises providing linear components disposed in a machine direction (MD) of the fabric; extruding a first layer of polymeric matrix material encapsulating one or more of the linear components thereby forming a first layer with a first external side and a first internal side; extruding a second layer of polymeric matrix material including a second external side and a second internal side; and providing a third layer that is an internal nonwoven layer between the first internal side of the first layer and the second internal side of the second layer.

In further embodiments of the method of forming the industrial fabric, the internal nonwoven layer is selected from the group consisting of: batt fiber, needled fiber, needled batt fiber, spunlaid (spunbond) material, airlaid nonwoven material, meltblown material, spunlace material (hydroentangled), spunmelt/SMS material, and wetlaid material.

In still further embodiments of the method of forming the industrial fabric, the extruding of the first layer of polymeric matrix material forms a spiral configuration.

In certain embodiments of the method of forming the industrial fabric, the linear components are yarns.

In certain further embodiments of the method of forming the industrial fabric, the linear components are selected from the group consisting of: multifilaments, monofilament yarns, cords, spun yarns, tapes, twisted tow yarns, and untwisted tow yarns.

In certain embodiments of the method of forming the industrial fabric, the linear components may be substantially parallel to one another, substantially in the same plane, or in a plurality of planes.

In further certain embodiments of the method of forming the industrial fabric, the linear components have a high modulus.

In certain embodiments of the method of forming the industrial fabric, the first layer of polymeric matrix material is crosshead extruded with the linear components.

In certain embodiments of the method of forming the industrial fabric, the linear components comprise a material selected from the group consisting of: thermoset plastics, carbon, glass, polyesters, and polyamides.

In certain other embodiments of the method of forming the industrial fabric, at least one of the first and second layers of extruded polymeric matrix material is selected from the group consisting of: thermoplastics, polyurethane, co-polyesters, co-polyamides, hot melt glues, a co-polymer of thermoplastic polyurethane (TPU) with acrylic, a co-polymer of TPU with a polyester elastomer, and a co-polymer of TPU with a polyamide elastomer.

In certain embodiments of the method of forming an industrial fabric, the industrial fabric comprises a first side and a second side, wherein the first side and the second side are planar and the linear components do not extend through the first side or the second side.

In certain embodiments of the method of forming an industrial fabric, the first side comprises a pattern.

In further certain embodiments of the method of forming an industrial fabric, the pattern on the first side is formed by a method selected from the group consisting of: laser etching, mechanical etching, embossing, and resin deposition.

In certain embodiments of the method of forming an industrial fabric, the pattern on the first side is formed by an additive process.

In certain embodiments of the method of forming an industrial fabric, the pattern on the first side is formed by a subtractive process.

In further certain embodiments of the method of forming an industrial fabric, the pattern on the first side is formed by a resin deposition technique selected from the group consisting of: a 3-D printing technique and an ink-jet printer technique.

In certain embodiments of the method of forming an industrial fabric, the industrial fabric is selected from the group consisting of: a conveyor belt: a papermachine clothing ("PMC"), wherein the PMC is a forming fabric, a press fabric, a dryer fabric, a shoe press belt, a transfer belt, a reel belt, a Through Air Drying ("TAD") fabric, an impression fabric, an Energy Efficient Technologically Advanced Drying ("eTAD") fabric, an Advanced Tissue Molding Systems ("ATMOS") fabric or belt, a New Tissue Technology ("NTT") fabric or belt, or a structured fabric: a double nip thickener ("DNT") fabric: a belt filter: a pulp washer: a belt, a fabric or a sleeve for the production of airlaid, spunbond, melt spun, or hydroentangled nonwoven material; a belt to produce a building product; a belt to produce oriented strand board ("OSB"); a fiber cement belt; a corrugator belt; a textile finishing belt; a sanforizing belt; a tannery belt; and a tannery sleeve.

DETAILED DESCRIPTION

Figures 1A, 1B, 2, 3, 4:
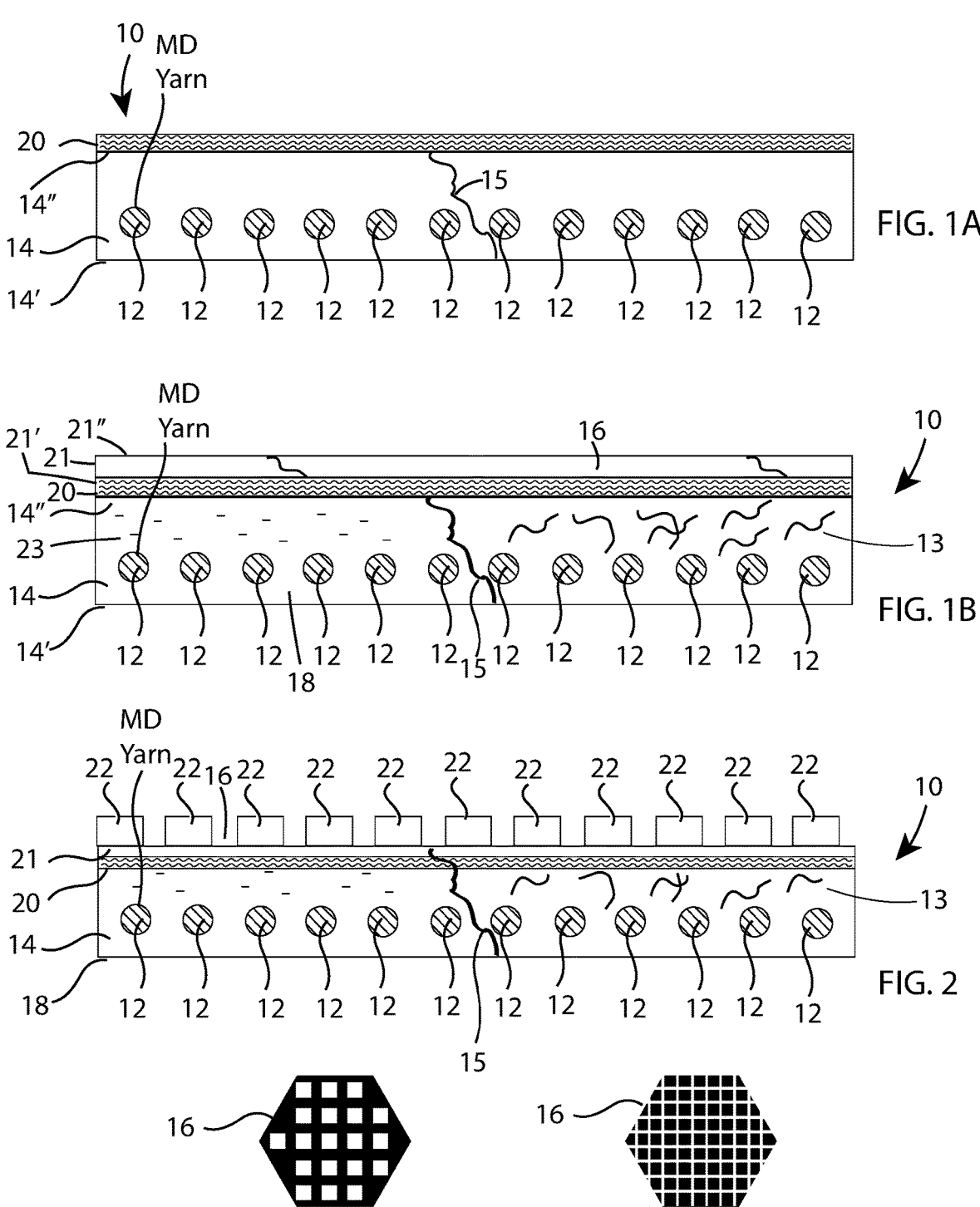
FIG. 1A is a transverse cross-sectional view in the cross-machine direction (CD) of a fabric or belt of the present disclosure, prior to the extrusion of a second layer (21) of polymeric matrix material over the layer of nonwoven material (20).
FIG. 1B is a transverse cross-sectional view in the CD of a fabric or belt of the present disclosure.
FIG. 2 is a cross-sectional view in the CD of a fabric of the invention, illustrating additive patterning as may be achieved by resin deposition on the faceside of the fabric of the present disclosure.
FIG. 3 illustrates a continuous additive pattern (dark areas area additive) as may be achieved by resin deposition on a faceside of a fabric of the present disclosure.
FIG. 4 illustrates a discrete additive pattern (dark areas are additive) as may be achieved by resin deposition on a faceside of a fabric of the present disclosure.

The terms "comprising" and "comprises" in this disclosure can mean "including" and "includes" or can have the meaning commonly given to the term "comprising or comprises" in U.S. Patent Law. Terms "consisting essentially of" or "consists essentially of" if used in the claims have the meaning ascribed to them in U.S. Patent Law. Other aspects of the disclosure are described in the disclosure or are known to those of ordinary skill in the art, after review of the disclosure.

The terms "yarns," and "fibers" are used interchangeably in the following disclosure and can refer to monofilaments, multifilament yarns, twisted yarns, textured yarns, coated yarns, otherwise spoolable material, as well as yarns made from stretch broken fiber known to those ordinarily skilled in the art. Yarns can be made of carbon, rayon, fiberglass, cotton, ceramic, aramid, polyester, polyolefins, metal, polyethylene, glass, polyamide, polyphenylene sulphide (PPS), and/or polyether ether ketone (PEEK) materials in the form of multifilaments, monofilaments, cords, spun yarns, tapes, twisted tow yarns, untwisted tow yarns, and/or other materials and forms that exhibit desired physical, thermal, chemical or other properties. Yarns can further be thermoplastics, thermoset elastics (elastomers), high modulus elastics (e.g., sufficient to be load-bearing) and/or non-elastics and can still further be fusible sheath/core yarns with a higher melting point core than the surrounding sheath.

The terms "machine direction" (MD) and "cross-machine direction" (CD) as used in the following disclosure are used in accordance with their well-understood meaning in the art. That is, the MD of an industrial fabric, such as a belt, refers to the direction that the industrial fabric moves in a manufacturing process, such as a tissue/towel or nonwovens making process, while CD refers to a direction perpendicular to the MD of the industrial fabric.

The present disclosure concerns an industrial fabric, such as a belt, for use e.g., in the papermaking or similar field. A first layer of extruded polymeric matrix material is cross-head extruded with linear components. A layer of nonwoven material is provided over the first layer of extruded polymeric matrix material, and a second layer of extruded polymeric matrix material is provided over the layer of nonwoven material so that the layer of nonwoven material is sandwiched between the first and second layers of extruded polymeric matrix material. In certain embodiments, the layer of nonwoven material has a length and a width substantially the same as the first and/or second extruded polymeric matrix material layers. In further embodiments, this layer of nonwoven material improves CD tensile properties of the industrial fabric.

Typically, the first and/or second layer of extruded polymeric material completely impregnates the nonwoven layer. For example, in a particular embodiment, about 50% of the nonwoven layer is first pressed into the first extruded polymeric matrix material layer, then the second polymeric matrix material layer is extruded and pressed into the remaining 50% of the nonwoven layer such that the nonwoven material layer is completely impregnated with polymeric matrix material, which in this embodiment, is equal parts polymeric matrix material from the first and second extruded polymeric matrix material layers. Furthermore, a portion of the second layer typically remains above the nonwoven material layer without impregnating the nonwoven material layer. Similarly, a portion of the first layer typically remains below the nonwoven material layer without impregnating the nonwoven material layer.

The linear components can be continuous systems, such as yarns, cords, tapes, or similar spoolable material. The linear components may be tension bearing and/or flexible. In certain embodiments, the linear components have a sufficiently high modulus to be load-bearing. A linear component of the invention may comprise any suitable material, such as an elastic or non-elastic thermoset plastic, thermoplastic, carbon, rayon, fiberglass, cotton, ceramic, aramid, polyester, metal, polyethylene, glass, polyamide, polyphenylene sulphide (PPS), and/or polyether ether ketone (PEEK) materials in the form of multifilaments, monofilaments, cords, spun yarns, tapes, twisted tow yarns, untwisted tow yarns, and/or other materials and forms that exhibit desired physical, thermal, chemical or other properties. Further embodiments of a linear component include a linear component comprising a coating and embodiments where the linear component comprises a core and a fusible sheath, where the core material has a lower melting point than the sheath material.

The linear components, such as yarns, are arranged in the MD of an industrial fabric of the invention. The linear components may be arranged adjacent to one another in the MD and spaced a certain distance apart from one another. In some embodiments, the linear components are arranged in the MD in a substantially parallel array. In further embodiments, the linear components are in substantially the same plane. In other embodiments, the linear components are in different planes. In a further embodiment, the industrial fabric includes a plurality of planes of linear components wherein the planes are not parallel to each other, in whole or in part. In yet other embodiments, at least two linear components are in parallel planes to one another while other linear components in the industrial fabric are in planes not parallel to the planes of the at least two linear components.

An industrial fabric of the invention may comprise one or more layers of linear components running in the MD that are at least partially encapsulated by a first-layer polymeric matrix material. In certain embodiments, one or more of the linear components are fully encapsulated by the first-layer polymeric matrix material. In some embodiments, all linear components in a fabric of the invention are fully encapsulated by the first-layer polymeric matrix material. In certain embodiments, the linear components are treated to bond chemically to the first-layer matrix material. The treatment (which may be, e.g., a resorcinol-formaldehyde-latex "RFL" based coating) may be a chemical coating applied to the linear components that is designed to bond to the linear component, bond to the first-layer polymeric matrix, and be resistant to hydrolysis if exposed through perforation of the final fabric.

The linear components may vary in number, material composition, and/or size (e.g., yarn diameter) within an industrial fabric of the invention. In certain embodiments, two or more of the linear components each comprise the same material and/or are the same size (e.g., diameter). In some embodiments, an industrial fabric of the invention comprises first and second linear components wherein one or more first linear components are of the same material and/or size while one or more second linear components are of a different material and/or size to the first linear components. In other embodiments, all of the linear components comprise the same material and/or are the same size.

In making an industrial fabric of the invention, a strip of polymeric matrix material (e.g., a resin) is typically extruded with the linear components in the machine direction of the fabric, such as a belt. This extrusion of the first-layer polymeric matrix material and of the linear components may be characterized as crosshead extrusion namely, simultaneous extrusion or extrusion at the same time. Crosshead extrusion may be utilized for this operation wherein the first-layer polymeric matrix material is melted and extruded together with previously manufactured linear components. Some embodiments may use an extrusion that is only a few inches wide.

An industrial fabric of the invention may be produced in endless belt form or in flat form.

The polymeric matrix material of the first layer, such as a resin, encapsulates one or more of the linear components. Encapsulation of the one or more linear components in the first-layer polymeric matrix material joins the linear components to make a first layer of an industrial fabric of the invention. In some embodiments, one or more linear components is partially encapsulated in the matrix material. In other embodiments, one or more linear components is wholly encapsulated in the matrix material. In certain embodiments, all linear components in an industrial fabric of the invention are wholly encapsulated by the polymeric matrix material. In various embodiments of the instant invention, all linear components in the industrial fabric are arranged in the MD of the first polymeric layer. In these embodiments, there are no linear components arranged in the CD of the first polymeric layer nor in the MD or CD of the second polymeric layer.

The polymeric matrix material (e.g., resin) of the first layer can be made of any suitable polymeric material for encapsulating one or more linear components. It is envisioned that one or more of many different extrudable polymer system(s) can be utilized, including, but without limitation, thermoplastics, polyurethanes, co-polyesters, co-polyamides, hot melt glues, co-polymers of thermoplastic polyurethane with acrylics, polyester elastomers and polyamide elastomers, and may include a coefficient of friction (COF) modifier. Typically, the polymeric matrix material of the first layer of the industrial fabric will have a melting temperature lower than that of the linear components.

The polymeric matrix material of the first layer can likewise be further reinforced by inclusion of fibers, such as carbon, glass, spunbond polyethylene, polyamides, polyesters, or similar materials such as polymeric fibers, airlaid, fine woven fabrics, etc. The polymeric matrix material may further include spunbonded, spunlaced, meltblown, or needled fiber structures or fabrics, in order to increase the integrity and overall strength of the fabric. Similarly, the polymeric matrix material can be further reinforced by the inclusion of nanoparticles, nanomaterials, inorganic filler particles (e.g., clays, $SiO_2$), and/or fiber materials, such as, without limitation, glass, carbon, inorganic fillers, or polymeric material to increase the physical properties of the resulting matrix. The reinforcing material, such as nanoparticles or nanomaterials, may be incorporated throughout the first layer of polymeric matrix material or incorporated in one or more portions of the first layer of polymeric matrix material. In certain embodiments, the reinforcing material, such as nanoparticles or nanomaterials, is incorporated evenly throughout the first layer of polymeric matrix material.

The polymeric matrix material of the second layer can be made of any suitable polymeric material, such as those disclosed for the first layer. It is envisioned that one or more of many different extrudable polymer systems can be utilized, including, but without limitation, thermoplastics, polyurethanes, co-polyesters, co-polyamides, hot melt glues, co-polymers of thermoplastic polyurethane with acrylics, polyester elastomers and polyamide elastomers, and may include a coefficient of friction (COF) modifier.

The polymeric matrix material of the second layer can likewise be further reinforced by inclusion of fibers, such as carbon, glass, spunbond polyethylene, polyamides, polyesters, or similar materials such as polymeric fibers, airlaid, fine woven fabrics, etc. The polymeric matrix material may further include spunbonded, spunlaced, meltblown, or needled fiber structures or fabrics, in order to increase the integrity and overall strength of the fabric. Similarly, the polymeric matrix material can be further reinforced by the inclusion of nanoparticles, nanomaterials, inorganic filler particles (e.g., clays, $SiO_2$), and/or fiber materials, such as, without limitation, glass, carbon, inorganic fillers, or polymeric material to increase the physical properties of the resulting matrix. The reinforcing material, such as nanoparticles or nanomaterials, may be incorporated throughout the second layer of polymeric matrix material or incorporated in one or more portions of the second layer of polymeric matrix material. In certain embodiments, the reinforcing material, such as nanoparticles or nanomaterials, is incorporated evenly throughout the second layer of polymeric matrix material.

In some embodiments, either the first extruded polymeric layer or the second extruded polymeric layer, or both the first and second extruded polymeric layers, comprise a COF modifier. For example, in certain embodiments, the first extruded polymeric layer (e.g., the backside or machine side of the fabric) comprises a siloxane low-friction additive to provide wearside slip to the industrial fabric.

In some embodiments, the faceside or paperside of an industrial fabric of the invention comprises a coating or film, e.g., to increase sheet adhesion. A coating may be sprayed, coated, or extruded. Other coatings, or in some embodiments, films, may be considered for hydrophobicity or other specific properties and applied to the faceside and/or machine side of an industrial fabric of the invention. In certain embodiments, a material is applied to the faceside surface of a fabric of the invention as a coating that improves sheet adhesion. A coating or film may be applied to a fabric of the invention that is impermeable, permeable, or is a fabric that has both impermeable and permeable portions.

In some embodiments, the first extruded polymeric layer and the second extruded polymeric layer may be made of the same material. In other embodiments, the first layer and second layer may each be made of a different material.

The internal nonwoven layer between the first and second layers of polymeric material can be batt fiber, needled fiber, needled batt fiber, spunlaid (spunbond) material, airlaid nonwoven material, meltblown material, spunlace material (hydroentangled), spunmelt/SMS (spunbond meltblown spunbond) material, wetlaid material, or similar material. Further, the addition of the nonwoven layer between the first and second layers of polymeric matrix material is expected to improve the cross-machine direction tensile properties of many embodiments of the industrial fabric. For example, in certain embodiments, the added layer of nonwoven material is intended to stabilize the cross-machine direction properties of the industrial fabric.

The fabric, such as a belt, of the present disclosure includes a first layer of polymeric matrix material that is typically extruded and encompasses the linear components. The first layer of polymeric matrix material forms a first external side and a first internal side. The first external side, in turn, forms the bottom (typically backside) of the fabric or belt. An internal layer of nonwoven material (such as, but not limited to, batt fiber, needled fiber or spunbond material) is placed on the first internal side of the first layer of polymeric material. A second layer of polymeric material is, e.g., extruded, over the layer of nonwoven material so as to form a second external side and a second internal side. The second internal side is placed on an internal layer of nonwoven material while the second external side forms the top (typically faceside or paperside) of the fabric or belt. Typically, the first and/or second layer of extruded polymeric material completely impregnates the nonwoven layer, which generally has a length and a width substantially the same as the first and/or second extruded polymeric layers. In a particular embodiment, about 50% of the nonwoven layer is first pressed into the first internal side of the first extruded polymeric matrix material layer, then the second internal side of the second polymeric matrix material layer is extruded and pressed into the remaining 50% of the nonwoven layer such that the nonwoven material layer is completely impregnated with polymeric matrix material, which in this embodiment, is equal parts polymeric matrix material from the first and second extruded polymeric layers. Furthermore, a portion of the second extruded polymeric layer typically remains above the nonwoven material layer without impregnating the nonwoven material layer. Similarly, a portion of the first extruded polymeric layer typically remains below the nonwoven material layer without impregnating the nonwoven material layer.

An industrial fabric of the invention, such as a belt, may be used in any number of industrial processes, including papermaking processes. In some embodiments, an industrial fabric of the invention is suitable for use as a papermachine clothing ("PMC"), such as forming fabrics, press fabrics, dryer fabrics, shoe press belts, transfer belts, reel belts, Through Air Drying ("TAD") fabrics, impression fabrics, Energy Efficient Technologically Advanced Drying ("eTAD") fabrics, Advanced Tissue Molding Systems ("AT-MOS") fabrics or belts, New Tissue Technology ("NTT") fabrics or belts, structured fabrics, as well as engineered fabrics (EF), such as double nip thickener ("DNT") fabrics, belt filters, pulp washer fabrics, belts/fabrics/sleeves for the production of nonwovens (for example, airlaid, spunbond, melt spun, hydroentangled), belts to produce building products (for example, oriented strand board ("OSB")), fiber cement belts, corrugator belts, textile finishing belts (for example, sanforizing belts), or tannery belts or sleeves.

In order to optimize the fabric (e.g., a belt) for use in a dewatering process, such as a forming section, press section, or dryer section, as well as use as a transfer belt or conveyor belt in a paper machine or a tissue production machine, the surface should allow a uniform pressure distribution and/or include a pattern on the faceside to be imprinted on the paper, board, tissue, or other material produced thereon. In certain embodiments, the fabric or belt including a patterned or unpatterned faceside may be used in such industrial applications as production of nonwovens, spunlace, building products, tissue, towel, board, shingles, medium-density fiberboard (MDF), and similar products. The fabric or belt can be configured to include a faceside and a backside formed from the polymer matrices of the second and first polymeric layers, respectively, so as to be impermeable to gas and/or liquids, such as water. However, in certain other embodiments, the fabric or belt may include perforations formed therethrough by mechanical, laser, or similar methods to provide for gas and/or liquid permeability. In yet other embodiments, the industrial fabric may include both permeable and impermeable sections or portions.

In certain embodiments, the patterning of the faceside (or "paperside") may vary in depth up to the maximum caliper of the final product (e.g., tissue or towel) produced thereon when patterned, without limitation, by such methods as laser, etching, or other type of surface removal techniques (similar to gravure printing or negative relief). The patterning may be prepared by such techniques, without limitation, as embossing techniques (e.g., from a patterned roll, belt, or other patterned media) or patterned by resin deposition onto the surface (e.g., similar to letterpress printing or positive relief). The resin deposition may be applied by three-dimensional printing techniques, such as ink-jet printing techniques or other resin injection techniques. A wide variety of pattern elements can be produced, such as, but not limited to, continuous or discontinuous lines, dots, logos, pictures, images, script, and text. In certain embodiments, the pattern element is selected from round shapes, polygonal shapes, lines, curves, letters, numbers, words, logos, waves, slits, drawings, trademarks, and/or any desired shape or combination of shapes to create any random or ordered pattern desired. In certain embodiments, the round shape is a circle or an oval. In yet other embodiments, the polygonal shape is selected from triangles, squares, rectangles, pentagons, hexagons, heptagons, octagons, rhombi, diamonds, and/or stars.

Patterns to be imparted from an industrial fabric of the invention to a product produced thereon would typically be implemented on the faceside in, e.g., inverted, reversed, or negative relief configuration, thereby causing a corresponding desired image to be imprinted on the paper, board, tissue, or other product material produced on an industrial fabric, such as a belt, of the instant invention.

Applications of an industrial fabric of the invention include, but are not limited to, plain (unpatterned) configurations for use as, e.g., an NTT belt or transfer belt, patterned configurations for use as, e.g., an impermeable NTT belt, laser-drilled patterned configurations for use as, e.g., a permeable NTT belt, or both patterned and drilled patterned belts.

In certain embodiments, an industrial fabric of the invention may be made by a spiral winding method. For example, a resin extruder may be provided to crosshead extrude the polymeric matrix material of the first layer together with the linear components as received from a creel. Strips of first-layer polymeric matrix material encompassing the linear components are spiral wound around two parallel support bars (the distance between the parallel support bars defining the length of the resulting industrial fabric) with adjacent passes of the extruded material being joined together. Similarly, the spiraling technique can be used to apply the second layer of polymeric matrix material (e.g., but without linear components). Certain embodiments use materials with sufficient green bonding to survive consolidation to turn the many strips into one band. Other options to form the bonding between strips are hot gas, infra-red, and laser bonding.

In certain embodiments, a spiraling technique may provide channels on a vented backside of the industrial fabric (e.g., a belt) to aid in dewatering, guiding, and/or stability. In other embodiments, the backside may be smooth (planar) or have a variable roughness (including, but not limited to ground, added fibers, or patterned) depending upon application needs, or include needled fibers that are incorporated into the structure of the fabric (e.g., belt).

It is envisioned that embodiments of this disclosure will result in improved steady-state performance when compared to prior-art fabrics. Further, the addition of the nonwoven layer between the first and second polymeric matrix material layers is expected to improve the cross-direction tensile properties of many embodiments of the industrial fabric or belt. In certain embodiments, inclusion of a nonwoven layer between the first and second polymeric layers results in an improvement by a factor of at least two, with various embodiments having an improvement by a factor of at least eight in the CD (cross-machine direction) modulus resulting in an improvement of the buckling load resistance in comparison to fabrics without the nonwoven layer. The improved performance is expected to be a function of buckling resistance at a lower overall thickness and basis weight.

More particularly, recalling that Bending Stiffness=M×I, where M is the cross-machine direction (CD) Modulus and I is the Moment of Inertia bending about the machine direction (MD) center in the CD, in certain embodiments, the purpose of the nonwoven reinforcement layer is to increase M while decreasing I to achieve better CD stability and resistance to buckling over crowned rolls while providing for the lightest possible product for the desired industrial application, recalling that $I=bh^3/12$, where h is the thickness of the product.

Figure 10:
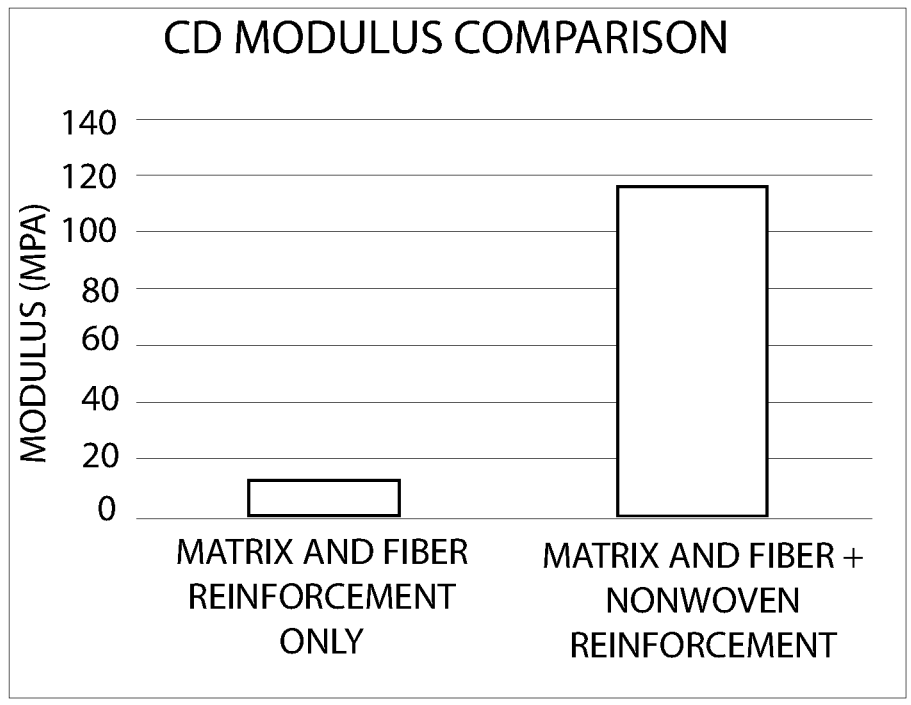
FIG. 10 is a chart comparing the CD modulus of an industrial fabric of the present invention to the CD modulus of an industrial fabric without an internal nonwoven layer.

Bending stiffness experiments were performed on an industrial fabric of the invention as compared to an industrial fabric without a nonwoven reinforcement layer, and the CD modulus determined for each fabric. The results of these experiments are summarized in Table I below as well as in FIG. 10. The results demonstrate that inclusion of an internal nonwoven reinforcement layer between first and second polymeric layers, where the first layer comprises MD linear components, results in a greater than 8-fold increase in CD modulus.

TABLE I

| CD Modulus Comparison | |
| --- | --- |
| CD analysis | Modulus (Mpa) |
| Matrix and Fiber Reinforcement Only | 14.3 |
| Matrix and Fiber + Nonwoven Reinforcement | 118 |
| x times improvement | 8.3 |

Referring now to the drawings in detail, one sees that FIGS. 1A, 1B and 2 illustrate a first layer of an industrial fabric 10 of the present disclosure. Linear components 12 are oriented in the machine direction and typically have a high modulus of elasticity thereby providing reinforcement to the fabric 10, particularly under a machine-direction tensile load. Linear components 12 may be substantially parallel to each other and in substantially the same plane. The linear components 12 can be continuous systems, such as, without limitation yarns, cords, tapes, or similar spoolable material. Linear components 12 can also be configured as multifilaments, monofilament yarns or spun yarns.

The linear components 12 are crosshead extruded with a polymeric matrix material, e.g., a resin, thereby forming a first layer of resin or polymeric matrix 14 with the linear components 12 encompassed within the first layer of resin matrix 14 forming a lower exterior face 14' and an upper interior face 14" (see FIGS. 1A and 1B). Many different extrudable polymer resin systems can be utilized, including, but without limitation, thermoplastics, polyurethanes, co-polyesters, co-polyamides, hot melt glues, co-polymers of thermoplastic polyurethane (TPU) with acrylics, polyester elastomers and polyamide elastomers. The linear components 12 of the finished fabric or belt may be completely encompassed by the first layer of resin matrix 14.

The first layer of resin matrix 14 can likewise be further reinforced by inclusion of fibers 13 (see FIGS. 1B and 2), which may be chopped, such as carbon, glass, spunbond polyethylene, polyamides, polyesters, or similar materials such as polymeric fibers, airlaid, fine woven fabrics, etc. The first layer of resin matrix 14 may further include spun-bonded, spunlaced, meltblown, or needled fiber structure, in order to increase the integrity and overall strength of the fabric. Similarly, the first layer of resin matrix 14 can be further reinforced by the inclusion of inorganic filler particles 23 (see FIG. 1B) such as nanoparticles, nanomaterials, and/or fiber materials such as, without limitation, glass, carbon, inorganic material, or polymeric material to increase the physical properties of the resulting matrix.

Figures 5, 6, 7:
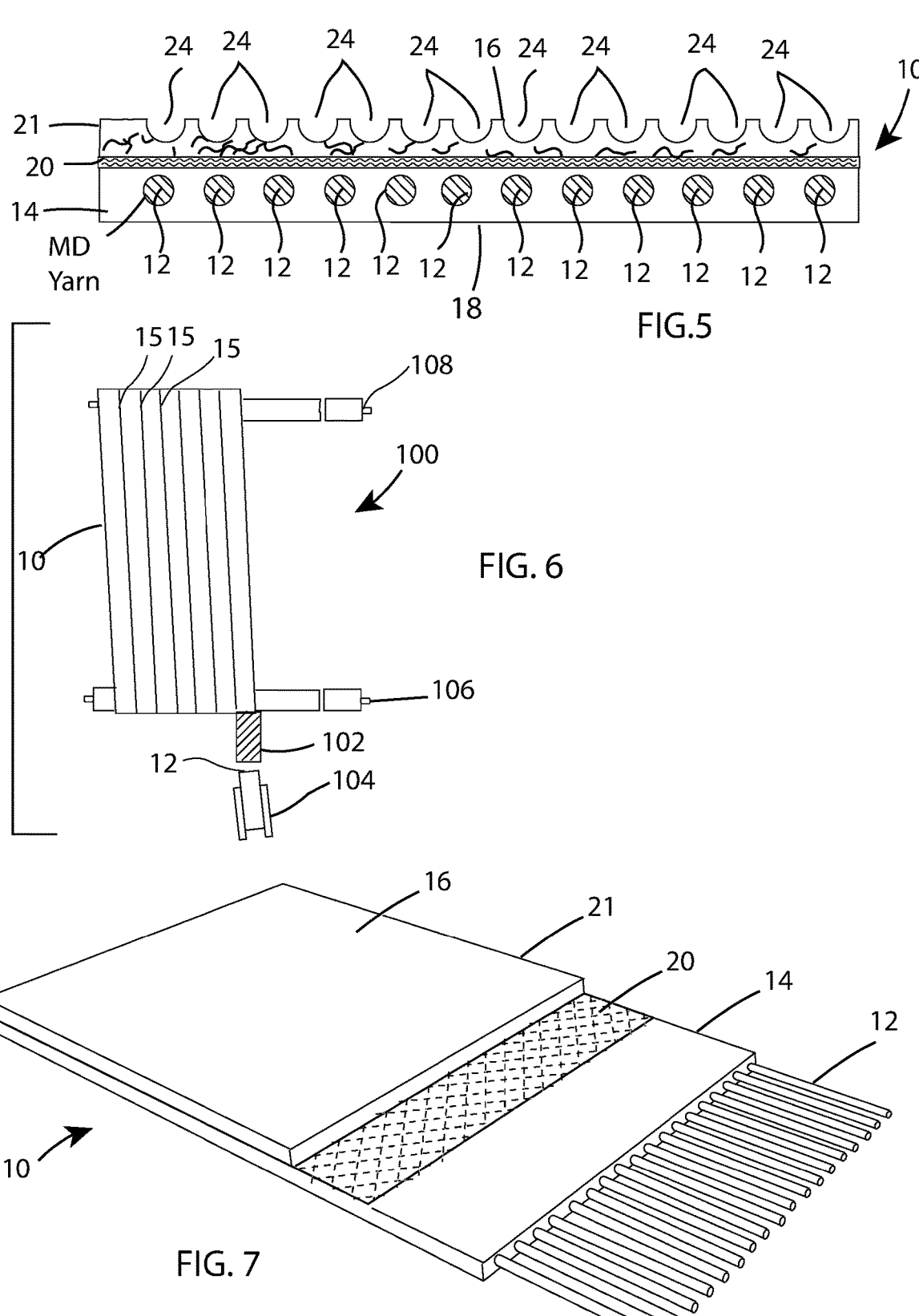
FIG. 5 is a cross-sectional in the CD view of a fabric of the invention, illustrating subtractive or removal patterning as may be achieved on the faceside of the fabric of the present disclosure.
FIG. 6 illustrates an apparatus for producing a spiral configuration of one of the embodiments of the fabric or belt of the present disclosure.
FIG. 7 is a perspective view, in partial cut-away, of a fabric of the invention, as illustrated in FIG. 1B.

As shown in FIGS. 1A and 1B (which illustrate the fabric or belt 10 of the present disclosure before and after, respectively, the extrusion of the second layer of polymeric matrix material 21 over the layer of nonwoven material 20), as well as the perspective cut-away view of FIG. 7, a layer of nonwoven material 20 is placed over the upper interior face 14" of first layer of polymeric matrix material 14. The layer of nonwoven material 20 may be e.g., batt fiber, needled fiber, needled batt fiber, spunlaid (spunbond) material, air-laid nonwoven material, meltblown material, spunlace material (hydroentangled), spunmelt/SMS material, wetlaid material, or similar material. Further, as shown in FIG. 1B, a second layer of polymeric matrix material 21, e.g., of material or materials similar to that of the first layer of polymeric matrix material 14, is extruded over the layer of nonwoven material 20 so that a lower interior face 21' of the second layer of polymeric matrix material 21 is positioned against the layer of nonwoven material 20. In other words, the layer of nonwoven material 20 is sandwiched or embedded between upper interior face 14" of first layer of polymeric matrix material 14 and lower interior face 21' of second layer of polymeric matrix material 21. In this configuration, upper exterior face 21" of the second layer of polymeric matrix material 21 forms faceside 16 of industrial fabric 10 while lower exterior face 14' of the first layer of polymeric matrix material 14 forms backside 18 of industrial fabric 10.

In certain embodiments, the first layer of polymeric matrix material 14 totally encompasses the linear components 12 thereby forming a backside (or machine side) 18 while the second layer of polymeric matrix material 21 forms faceside (or paperside) 16, as shown in FIG. 1B. In certain embodiments, the linear components 12 are not exposed and do not pass or extend through the faceside 16 or backside 18 of the finished fabric 10.

When industrial fabric 10 is produced by methods similar to that illustrated in FIG. 6, sequential extrusion passes (crosshead extrusion of linear components 12 and polymeric matrix material 14) may be joined by weld line 15 to form the first layer as illustrated in Figures IA, 1B and 6.

In order to optimize the fabric (e.g., belt) for use in a dewatering process, such as a forming section, press section, or dryer section, as well as use as a transfer belt or conveyor belt in a paper machine or a tissue production machine (such as Valmet Advantage NTT or other textured tissue producing paper machines), the surface of faceside 16 should be prepared to allow a uniform pressure distribution and/or a pattern to be imprinted in the produced paper, board, or tissue. Both patterned and unpatterned belts may also be used in other industrial applications, such as building products, etc. In certain embodiments, an industrial fabric, such as a belt, of the instant invention is completely impermeable to air and/or water. Other embodiments of the industrial fabric may include both permeable and impermeable sections or portions. In other embodiments, fabric 10 may be perforated via a variety of means (e.g., laser or mechanical) to provide permeability to gases and/or liquids.

Applications of industrial fabric 10 include, but are not limited to, plain (unpatterned) configurations for use as, e.g., an NTT belt or transfer belt, patterned configurations for use as, e.g., an impermeable NTT belt, laser drilled patterned configurations for use as, e.g., a permeable NTT belt, or both patterned and drilled patterned belts.

Figure 8:
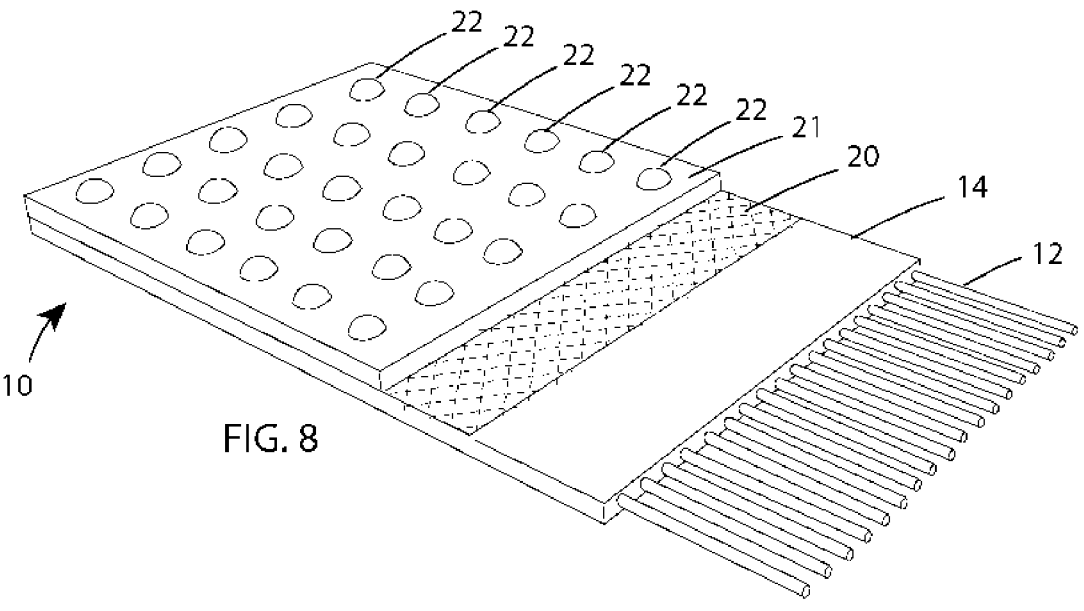
FIG. 8 is a perspective view, in partial cut-away of a fabric of the invention, including additive elements, as illustrated in FIG. 2.

In certain embodiments, the patterning of the faceside 16 may vary in depth when patterned by additive processes, e.g., up to a maximum caliper of the finished product produced on the fabric. As can be seen in FIG. 2, faceside 16 may include additive pattern elements 22, which may be formed by such processes as resin deposition on the resin matrix 21 while maintaining impermeability of faceside 16. These additive pattern elements 22 may form continuous additive patterns 22 as shown in FIG. 3 (dark areas are additive) or may form discretized additive patterns as shown in FIG. 4 (dark areas are additive). A perspective cut-away view of the fabric 10 of FIG. 2 is shown in FIG. 8.

Figure 9:
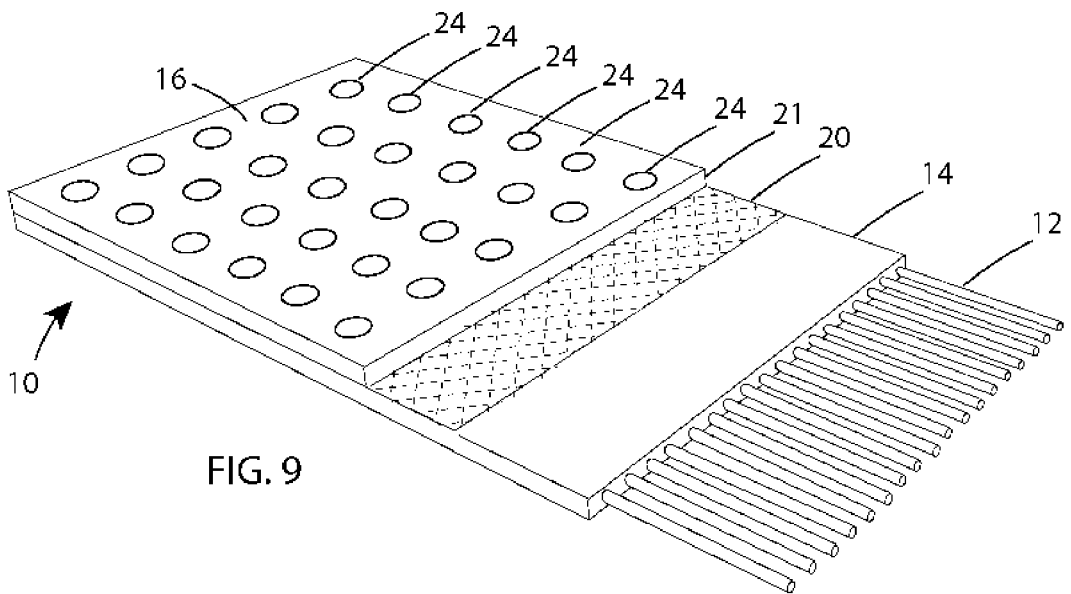
FIG. 9 is a perspective view, in partial cut-away, of a fabric of the invention, including subtractive elements, as illustrated in FIG. 5.

Similarly, as shown in FIG. 5, faceside 16 may include subtractive pattern elements 24, such as voids and patterns in the resin matrix 21, which are formed by material removal, such as, but not limited to, laser, etching, or other type of surface removal techniques (similar to gravure printing or negative relief), while maintaining impermeability of faceside 16. These subtractive pattern elements 24 may form continuous subtractive patterns as shown in FIG. 3 (white areas are subtractive) or may form discretized subtractive patterns 24 as shown in FIG. 4 (white areas are subtractive). A perspective cut-away view of the fabric 10 of FIG. 5 is shown in FIG. 9.

In summary, the patterning may be prepared by such techniques, without limitation, as laser techniques or embossing techniques (e.g., from a patterned roll, belt, or other patterned media) or patterned by resin deposition onto the surface (e.g., similar to letterpress printing or positive relief). The resin deposition may be applied by three-dimensional printing techniques, such as ink-jet printing techniques or other resin injection techniques. A wide variety of patterns can be produced, such as, but not limited to, continuous or discontinuous lines, dots, logos, pictures, images, script, and text.

Patterns to be imparted from the fabric 10 to the product would be implemented on the faceside in, e.g., inverted, reversed, or negative relief configuration, thereby causing a corresponding desired image to be imprinted on the paper, board, tissue, or similar product material produced on an industrial fabric, such as a belt, of the instant invention.

FIG. 6 is illustrative of an apparatus 100 of one method of forming the first layer of an industrial fabric 10. A resin extruder 102 is provided to crosshead extrude the resin material (of resin matrix 14) and the material of linear components 12 as received from spool 104. Strips of resin material encompassing the linear components are spiral wound around two parallel support bars 106, 108 (the distance between parallel support bars 106, 108 defining the length of the resulting industrial fabric 10) with adjacent passes of the extruded material being joined together at weld lines 15. Similarly, the spiraling technique illustrated in FIG. 6 can be used to apply the second layer of polymeric matrix material. Certain embodiments use materials with sufficient green bonding to survive consolidation to turn the many strips into one band. Other options to form the bonding between strips are hot gas, infra-red, and laser bonding.

In certain embodiments, the spiraling technique may provide channels on a vented backside to aid in dewatering, guiding, and stability. In other embodiments, the backside may be smooth or planar, have a variable roughness or include needled fibers that are incorporated into the structure of the fabric or belt.

Modifications to the above would be obvious to those of ordinary skill in the art, but would not bring the invention so modified beyond the scope of the present invention. The claims to follow should be construed to cover such situations.

What is claimed is:

1. A method of forming an industrial fabric, comprising:
    extruding a first polymeric matrix material to form a first layer of polymeric matrix material with a first external side and a first internal side, the first polymeric matrix material including a polymer encapsulating a plurality of machine direction (MD) linear components, wherein the first external side forms a backside of the industrial fabric;

extruding polymeric material to form a second layer of polymeric matrix material with a second external side and a second internal side, wherein the second external side forms a faceside of the industrial fabric and is configured to receive a paper, nonwoven, building product, or similar product; and providing a third layer that is an internal nonwoven layer between the first internal side of the first layer and the second internal side of the second layer.

2. The method of claim 1, wherein the internal nonwoven layer is selected from the group consisting of: batt fiber, needled fiber, needled batt fiber, spunlaid (spunbond) material, airlaid nonwoven material, meltblown material, spunlace material (hydroentangled), spunmelt/SMS material, and wetlaid material.

3. The method of claim 1, wherein the extruding of the first layer of polymeric matrix material forms a spiral configuration.

4. The method of claim 1, wherein the machine direction (MD) linear components are yarns.

5. The method of claim 1, wherein at least one of the first or second layers of extruded polymeric matrix material is selected from the group consisting of: thermoplastics, polyurethane, co-polyesters, co-polyamides, hot melt glues, a co-polymer of thermoplastic polyurethane (TPU) with acrylic, a co-polymer of TPU with a polyester elastomer, and a co-polymer of TPU with a polyamide elastomer.

6. The method of claim 1, wherein the second external side of the second extruded polymeric matrix material layer comprises a pattern on the faceside of the industrial fabric configured to impart a corresponding pattern in the paper, nonwoven, building product, or similar product produced thereon.

7. The method of claim 6, comprising forming the pattern on the second external side of the second layer using an additive and/or subtractive process.

8. The method of claim 6, wherein the pattern on the second external side of the second layer is formed by a method selected from the group consisting of: laser etching, mechanical etching, embossing, and resin deposition.

9. The method of claim 6 wherein the pattern on the second external side of the second layer is formed by a resin deposition technique selected from the group consisting of: a 3-D printing technique and an ink-jet printer technique.

10. The method of claim 1, wherein the industrial fabric is selected from the group consisting of: a conveyor belt; a papermachine clothing ("PMC"), wherein the PMC is a forming fabric, a press fabric, a dryer fabric, a shoe press belt, a transfer belt, a reel belt, a Through Air Drying ("TAD") fabric, an impression fabric, an Energy Efficient Technologically Advanced Drying ("eTAD") fabric, an Advanced Tissue Molding Systems ("ATMOS") fabric or belt, a New Tissue Technology ("NTT") fabric or belt, or a structured fabric; a double nip thickener ("DNT") fabric; a belt filter; a pulp washer; a belt, a fabric or a sleeve for the production of airlaid, spunbond, melt spun, or hydroentangled nonwoven material; a belt to produce a building product; a belt to produce oriented strand board ("OSB"); a fiber cement belt; a corrugator belt; a textile finishing belt; a sanforizing belt; a tannery belt; and a tannery sleeve.

11. The method of claim 1, further comprising:

placing the third layer on the first internal side of the first layer; and placing the second internal side of the second layer on the third layer.

12. The method claim 1, wherein extruding the first polymeric matrix material includes crosshead extrusion.

13. The method of claim 1, further comprising:

impregnating the third layer with the first layer of polymeric matrix material or the second layer of polymeric matrix material.

14. The method of claim 1, further comprising:

impregnating the third layer with the first layer of polymeric matrix material and the second layer of polymeric material.

15. The method of claim 1, further comprising:

impregnating the third layer with the second layer of polymeric matrix material, wherein the second internal side of the second layer impregnates the third layer and the second external side of the second layer does not impregnate the third layer.

16. The method of claim 1, wherein the first layer of polymeric matrix material or the second layer of polymeric matrix material includes fibers, nanoparticles, nanomaterials, or inorganic filler particles.

* * * * *